United States Patent
Moebius et al.

(10) Patent No.: US 11,953,625 B2
(45) Date of Patent: Apr. 9, 2024

(54) BEAMSPLITTER ARCHITECTURE FOR MONOSTATIC LIDAR

(71) Applicant: The Charles Stark Draper Laboratory, Inc., Cambridge, MA (US)

(72) Inventors: Michael G. Moebius, Arlington, MA (US); Lucas D. Benney, Brighton, MA (US); Steven J. Spector, Lexington, MA (US); Steven J. Byrnes, Watertown, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 941 days.

(21) Appl. No.: 16/773,145

(22) Filed: Jan. 27, 2020

(65) Prior Publication Data
US 2021/0231780 A1 Jul. 29, 2021

(51) Int. Cl.
*G01S 7/48* (2006.01)
*G01S 7/481* (2006.01)
*G01S 7/4912* (2020.01)

(52) U.S. Cl.
CPC .......... *G01S 7/4816* (2013.01); *G01S 7/4917* (2013.01)

(58) Field of Classification Search
USPC ....................................................... 356/5.01
See application file for complete search history.

(56) References Cited

U.S. PATENT DOCUMENTS

| | | | | |
|---|---|---|---|---|
| 5,082,342 A * | 1/1992 | Wight | ...................... | G02F 1/025 372/44.01 |
| 5,847,815 A | 12/1998 | Albouy et al. | | |
| 10,101,203 B2 * | 10/2018 | Birk | ...................... | G01J 3/36 |
| 10,771,155 B2 * | 9/2020 | McLaurin | ............. | H04B 10/116 |
| 10,838,150 B2 * | 11/2020 | Moebius | ................... | G02B 6/34 |
| 2003/0011888 A1 * | 1/2003 | Cox | ................... | H01L 31/02325 257/E31.128 |
| 2007/0053635 A1 * | 3/2007 | Iazikov | ...................... | G02B 5/32 385/37 |
| 2008/0031570 A1 * | 2/2008 | Fondeur | ............. | G02B 6/12011 385/18 |
| 2014/0376001 A1 * | 12/2014 | Swanson | ................. | G01N 21/17 356/479 |
| 2017/0242191 A1 * | 8/2017 | Rhee | ...................... | G02B 6/136 |

(Continued)

OTHER PUBLICATIONS

Duck, et al., "Monostatic Lidar at f/200: A New Instrument at Millstone Hill / MIT Haystack Observatory," Advances in Laser Remote Sensing, pp. 73-76, 2001.

*Primary Examiner* — James R Hulka
(74) *Attorney, Agent, or Firm* — Brooks Kushman P.C.

(57) ABSTRACT

A LiDAR system includes a light source and an arrayed micro-optic configured to receive light from the light source so as to produce and project a two-dimensional array of light spots on a scene. The LiDAR system also includes receiver optics having an array of optical detection sites configured so as to be suitable for establishing a one-to-one correspondence between light spots in the two-dimensional array and optical detection sites in the receiver optics. The LiDAR system further includes a beamsplitter and a lens. The LiDAR system may also include a mask placed in the light path between the beamsplitter and the receiver optics. Alternatively, the LiDAR system may include a controller programmed to activate or deactivate each optical detection site.

17 Claims, 10 Drawing Sheets
(10 of 10 Drawing Sheet(s) Filed in Color)

(56) References Cited

U.S. PATENT DOCUMENTS

| | | |
|---|---|---|
| 2017/0269215 A1 | 9/2017 | Hall et al. |
| 2018/0073862 A1* | 3/2018 | Sirat ................. G02B 21/0072 |
| 2018/0172918 A1* | 6/2018 | Lane ................. H04Q 11/0005 |
| 2018/0175961 A1* | 6/2018 | Spector ................. G01S 7/4814 |
| 2019/0116355 A1* | 4/2019 | Schmidt ................. G01S 7/486 |
| 2019/0162908 A1 | 5/2019 | Moebius et al. |
| 2019/0167081 A1* | 6/2019 | Hillman ............. A61B 1/00172 |
| 2019/0326988 A1* | 10/2019 | McLaurin ............. H01S 5/4012 |
| 2019/0334618 A1* | 10/2019 | McLaurin ............ H04B 10/116 |
| 2020/0186258 A1* | 6/2020 | Brown ................. H04B 10/11 |
| 2020/0374004 A1* | 11/2020 | McLaurin ............... H01S 5/005 |

* cited by examiner

BEAMSPLITTER ARCHITECTURE FOR MONOSTATIC LIDAR

TECHNICAL FIELD

The present invention relates to Light Detection and Ranging, and more particularly to a beamsplitter architecture for monostatic Light Detection and Ranging.

BACKGROUND ART

Monostatic Light Detection and Ranging (LiDAR) systems have the advantage, over bistatic systems, of not being affected by parallax. However, this requires the transmitter and receiver to be at the same location or located along the same optical path. Physically, the transmitter and receiver cannot be placed in the same location. Other solutions (for photonic integrated circuit-based solid-state LiDAR or optical communications systems), such as using an integrated 3-dB splitter in a waveguide to provide separate paths for the outgoing signal and return signal can lead to crosstalk and additional return signal loss.

SUMMARY OF THE EMBODIMENTS

The deficiencies of the prior art are overcome by separating the optical transmit and receive paths. A beamsplitter is placed above the transmitter. The receiver is placed such that a portion of the received signal is redirected to the receiver. The configuration of the transmitter, beamsplitter, and receiver can be adjusted to maximize the return signal detected, minimize the impact of background light, and simplify assembly and alignment of the device. Concepts to address each of these points are included in this disclosure.

In accordance with one embodiment of the invention, a LiDAR system includes a light source and an arrayed micro-optic configured to receive light from the light source so as to produce and project a two-dimensional array of light spots on a scene. The LiDAR system also includes receiver optics having an array of optical detection sites configured so as to be suitable for establishing a one-to-one correspondence between light spots in the two-dimensional array and optical detection sites in the receiver optics. The LiDAR system further includes a beamsplitter and a lens, arranged so that light travels from the arrayed micro-optic to the beamsplitter, from the beamsplitter to the lens, and from the lens to the scene, and further so that light reflected from the scene travels from the scene to the lens, from the lens to the beamsplitter, and from the beamsplitter to the receiver optics.

Alternatively or in addition, the LiDAR system also includes a mask having an array of apertures placed in the light path between the beamsplitter and the receiver optics, wherein each of the apertures is placed in front of a respective one of the optical detection sites.

In a further related embodiment, the mask is built into the receiver optics. Alternatively or in addition, the mask includes a metal layer having a plurality of openings, each opening being in the light path leading to a respective one of the optical detection sites. In a further related embodiment, the metal is aluminum or copper.

Also alternatively or in addition, a shape of at least one of the apertures corresponds to a shape of a light spot received at the respective optical detection site. In a further related embodiment, a shape of at least one of the apertures is different from a shape of another one of the apertures. Alternatively or in addition, a shape of at least one of the apertures is selected to mitigate variations in manufacturing of the respective optical detection site or a thermal shift of the respective optical detection site. In a further related embodiment, the beamsplitter is a polarization selective beamsplitter.

In accordance with another embodiment of the invention, a LiDAR system includes a light source and an arrayed micro-optic configured to receive light from the light source so as to produce and project a two-dimensional array of light spots on a scene. The LiDAR system also includes receiver optics having an array of optical detection sites configured so as to be suitable for establishing a one-to-one correspondence between light spots in the two-dimensional array and optical detection sites in the receiver optics. The LiDAR system further includes a beamsplitter and a lens, arranged so that light travels from the arrayed micro-optic to the beamsplitter, from the beamsplitter to the lens, and from the lens to the scene, and further so that light reflected from the scene travels from the scene to the lens, from the lens to the beamsplitter, and from the beamsplitter to the receiver optics. The LiDAR system also includes a controller, wherein the controller is programmed to selectively activate or deactivate each one of optical detection sites in the array of optical detection sites.

Alternatively or in addition, a size of each optical detection site is smaller than a size of each light spot projected onto the receiver optics. In a further related embodiment, the optical detection sites are SPAD detectors. In another related embodiment, the optical detection sites are SiPM detectors. Alternatively or in addition, the LiDAR system includes an array of lenslets placed in a light path between the beamsplitter and the receiver optics, wherein each lenslet is placed in front of a respective one of the optical detection sites.

Also alternatively or in addition, the arrayed micro-optic includes an array of optical emission sites and the controller is further configured to selectively activate or deactivate each one of the optical emission sites in the array of optical emission sites. In a further related embodiment, an activation state of at least one of the array of optical emission sites determines an activation state of an associated at least one of the optical detection sites in the array of optical detection sites.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which.

DETAILED DESCRIPTION OF SPECIFIC EMBODIMENTS

Figure 1:
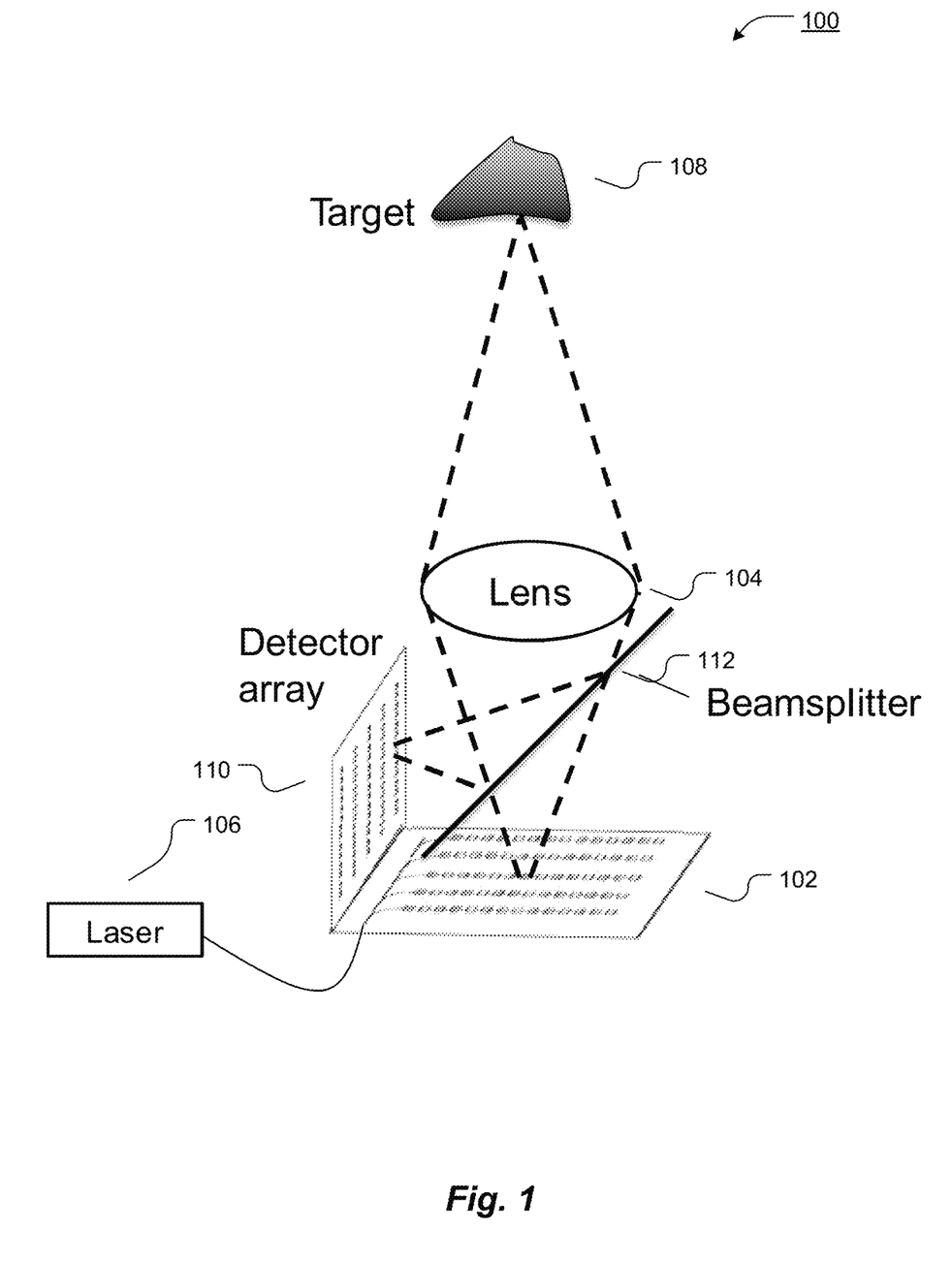
FIG. 1 shows a LiDAR system in accordance with an embodiment of the present invention.

FIG. 1 shows a LiDAR system 100 in accordance with an embodiment of the present invention. The LiDAR system 100 may include a photonic integrated circuit (PIC) beam steering chip 102 placed at the focal plane of an objective lens 104 (switched focal plane array solid-state LiDAR). The PIC may be manufactured as an arrayed micro-optic, including an array of optical emission sites. Light emitted from a light source 106, such as a laser source, is routed on the PIC 102 using waveguides, and micro-electro-mechanical (MEMS) structures determine from which optical emission sites on the PIC 102 light is emitted toward a scene 108 to be scanned. While a combination of a single laser source and a PIC is recited throughout this disclosure, it is expressly contemplated that any other planar emitter array, e.g. an array of vertical-cavity surface-emitting lasers (VCSELs), could be used and incorporated into the embodiments disclosed herein instead of or in addition to a single laser source and a PIC.

The laser light is projected onto the scene 108 as a two-dimensional array of light spots. The PIC 102 may be configured project groups of light spots simultaneously. In alternative embodiments, light spots can be projected sequentially. Transmit and receive paths are separated using a beamsplitter 112. Receiver optics, such as a detector array having a plurality of optical detection sites, receives the return signal from the scene 108. As described in further detail below, the optical emission sites and optical detection sites correspond to one another. There may be a one-to-one correspondence or a one-to-n correspondence (e.g., more than one optical detection site corresponds to one optical emission site). Therefore, there is also a correspondence between the two-dimensional array of light spots in the scene 108 and the array of optical detection sites in the receiver optics. Again, the correspondence may be a one-to-one correspondence or a one-to-n correspondence (e.g., more than one optical detection sites corresponds to one light spot in the two-dimensional array projected onto the scene).

Light is emitted from the optical emission sites on the PIC 102. The beamsplitter 112 is placed between the PIC 102 and the lens 104. The lens 104 focuses outgoing light into the scene 108. Return signal is collected by the lens 104 and directed toward the beamsplitter 112. The PIC 102 is located on one side of the beamsplitter 112, while the detector array/receiver optics 110 is located on the other side of the beamsplitter 112 such that the PIC 102 and detector array 110 are approximately aligned to form a mirror-image pair with respect to a semi-reflective surface of the beamsplitter 112. Return signal directed to the detector array 110 does not need to pass through a PIC to reach the detector. Instead, the detector array 110 has a direct mapping of detector elements to emission locations on the transmit PIC 102. One or more detection sites are assigned and aligned to each emission site, as shown in more detail below with reference to FIG. 4. The outgoing light from the PIC 102 passes through the objective lens 104, which will introduce some aberrations and define the shape of the outgoing beam in the scene 108. This beam shape and transmission of signal photons through the objective 104 on the return defines the shape of the signal beamspot on the detector array 110.

A series of embodiments can maximize the return signal detected, minimize the impact of background light, and simplify assembly and alignment.

Figure 2:
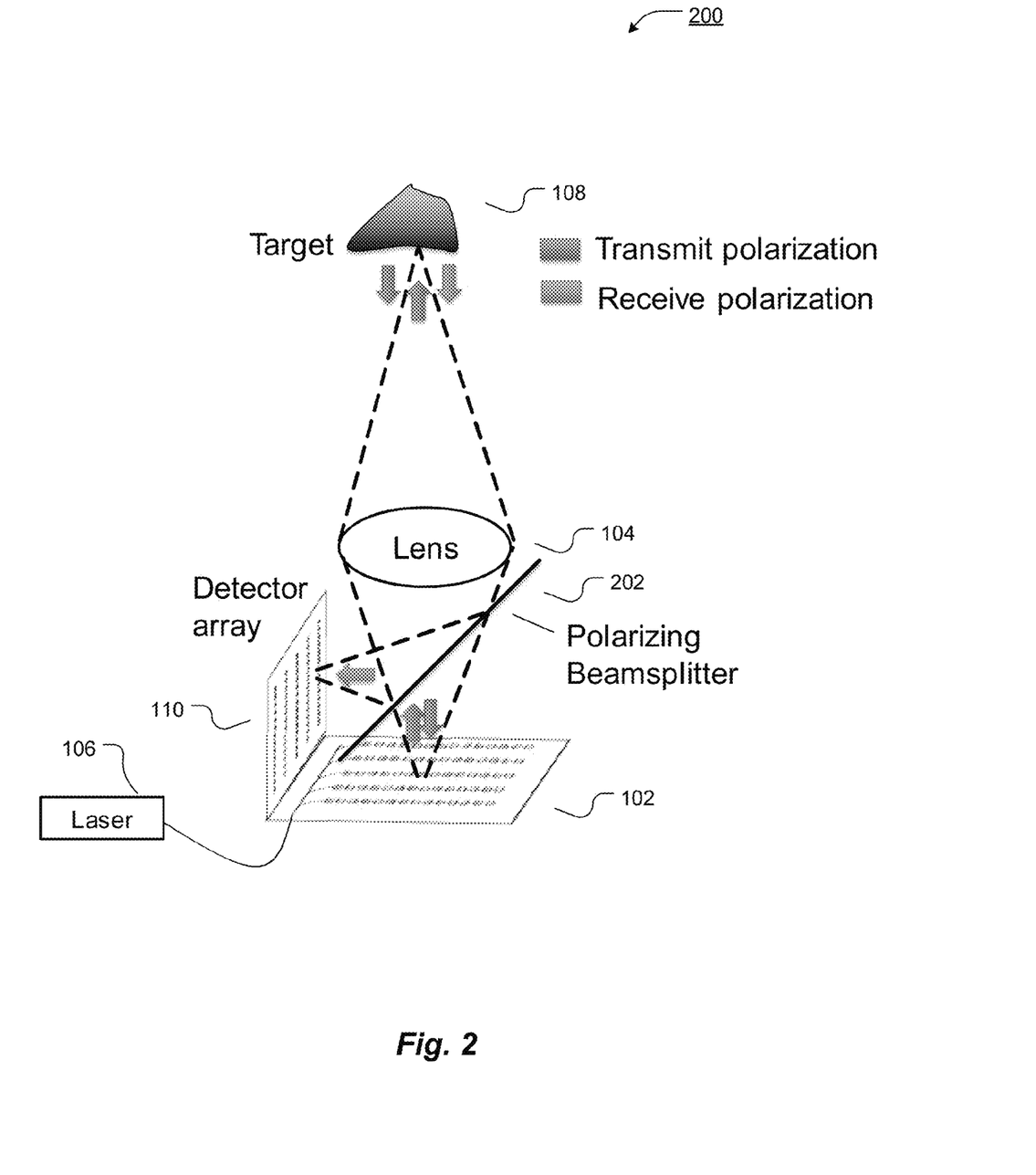
FIG. 2 shows a LiDAR system in accordance with an embodiment of the present invention.

FIG. 2 shows a LiDAR system 200 similar to the one described in reference to FIG. 1. LiDAR system 200 uses a polarization selective beam splitter 202 that avoids the 3-dB loss associated with transmitting the outgoing light through a 50/50 beamsplitter. This maximizes the laser power that reaches the target 108.

Figure 3:
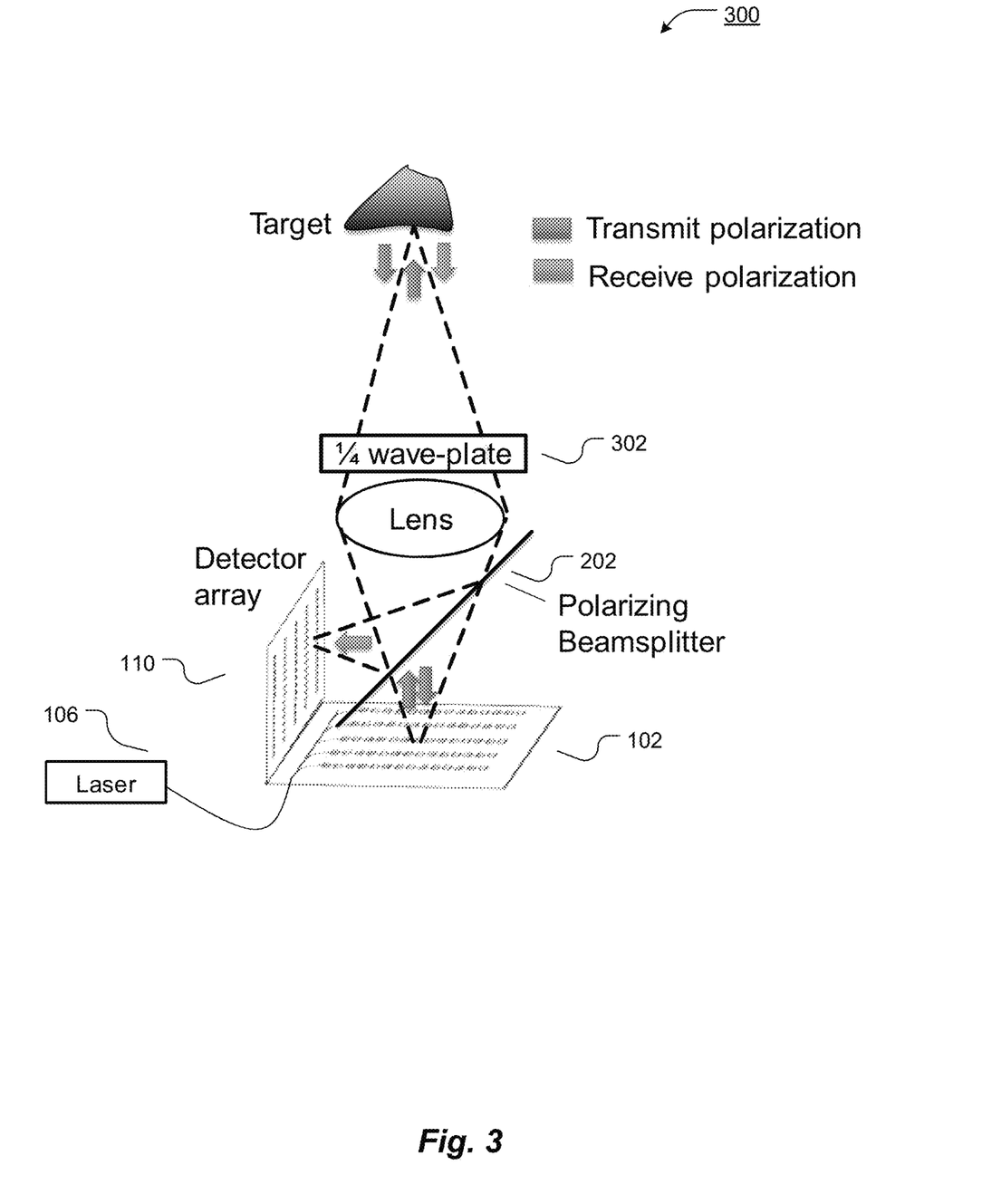
FIG. 3 shows a LiDAR system in accordance with an embodiment of the present invention.

FIG. 3 shows a LiDAR system 300 similar to the one described in reference to FIG. 1. LiDAR system 300 includes a ¼ waveplate 302 after the polarizing beamsplitter 202. The waveplate may be located in front, behind, or within the objective lens train. The ¼ waveplate 302 converts linearly polarized light to circular polarization. Linearly polarized light is preferentially reflected in the same polarization, but circular polarized light is reflected from most surfaces with a random polarization, and indeed reflected from certain retroreflectors with opposite circular polarization. Therefore the ¼ waveplate 302 is advantageous when using a polarizing beamsplitter to ensure that sufficient signal reaches the detector 110. The detector 110 receives roughly half the total signal, equivalent to the case with a 50/50 beamsplitter 112 as shown in FIG. 1. The overall link loss improvement using a polarizing beamsplitter 202 versus a 50/50 beamsplitter 112 is approximately 3 dB (less any loss from transmission through the ¼ waveplate 302).

Figure 4:
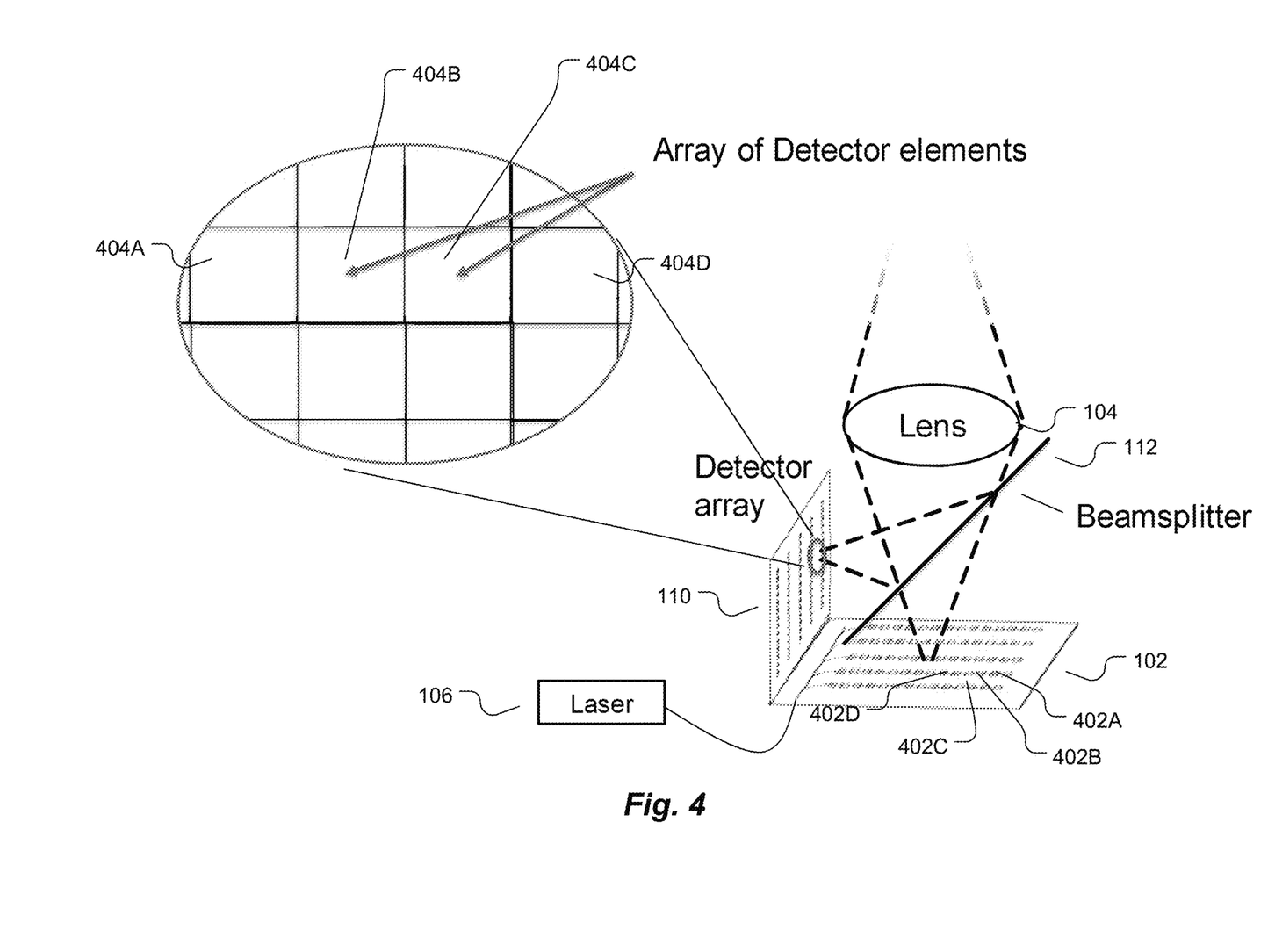
FIG. 4 shows a detector array in accordance with an embodiment of the present invention.

FIG. 4 shows a detector array in accordance with an embodiment of the present invention. Every light spot projected onto the scene be an optical emission site 402A-D has at least one corresponding optical detection site 404A-D. Exemplarily, the light spot projected by emission site 402A corresponds to detection site 404A, the light spot projected by emission site 402B corresponds to detection site 404B, the light spot projected by emission site 402C corresponds to detection site 404C, and the light spot projected by emission site 402D corresponds to detection site 404D, where "corresponds" means that the two locations in three-dimensional space are approximately reflections of one another about the semi-reflective surface of the beamsplitter 112. In general, the correspondence between light spots projected onto the scene by emission sites and the detection sites is determined by the layout of emission sites on the PIC and the layout of optical detection sites on the receiver optics. It is also expressly contemplated that more than one optical detection site may correspond to one emission site or the light spot projected onto the scene by one emission site.

Figure 5:
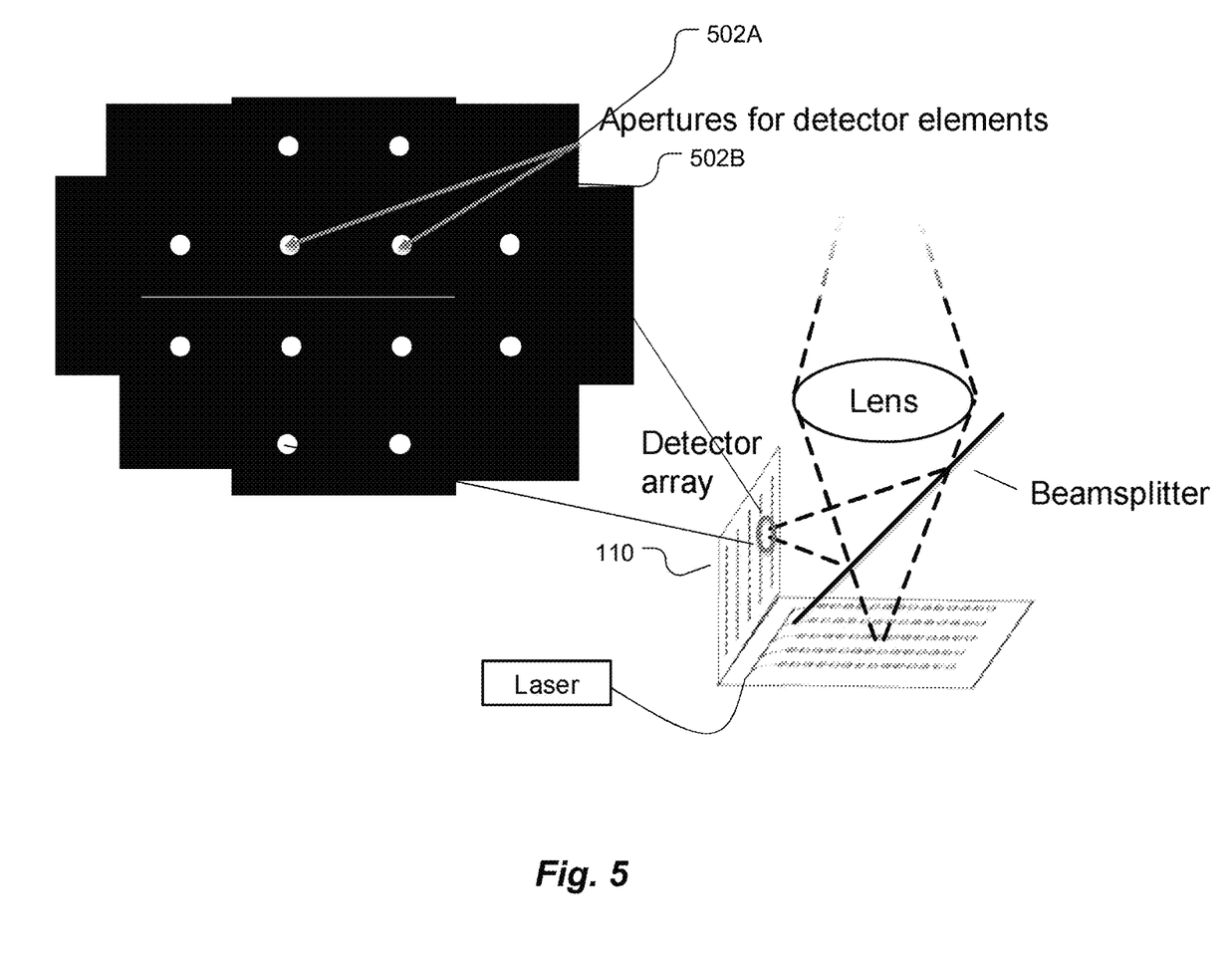
FIG. 5 shows a mask having an array of apertures in accordance with an embodiment of the present invention.

FIG. 5 shows a mask having an array of apertures in accordance with an embodiment of the present invention. An aperture can be placed in front of each detection site in the receiver optics 110 so that it is in the light path between the beamsplitter 112 and the receiver optics 100. By way of example, apertures 502A and 502B are shown. These apertures mask the corresponding optical detection sites located behind them.

Matching the shape and size of the aperture to the expected return signal beamspot enables maximizing the amount of signal that makes it to the detection site, while minimizing the area through which background photons can reach the detection site. For example, the shape and size of the light spot projected onto an optical detection site as a reflection could determine the shape and size of the corresponding aperture. In other words, the shape and size of the apertures may be selected according to the spread function of the expected return signal at the corresponding optical detection site, for example to correspond to known aberrations of the lens 104. Exemplarily, the shapes of the apertures may vary across the array of apertures as the aberrations are not the same throughout the detector array. Lens aberrations may be modeled or measured to determine the size and shape of the apertures. In addition or alternatively, the size and shape of the apertures could be selected to mitigate variations in manufacturing of the respective optical detection site, or it could be selected to mitigate an expected or measured thermal shift of the respective optical detection site. The apertures could all be of the same shape and size, or the apertures could have different shapes and sizes.

Hardware solutions for producing the mask with the array of apertures include introducing a physical light barrier. The mask could, for example, have an array of openings that allow light to reach the optical detection sites in the detector array. Each opening in the mask is located in the light path leading to a respective one of the optical detection sites. The mask may, for example, be made from a metal usually found in a CMOS foundry, such as copper or aluminum, or it may be made from any other suitable material. The mask could also be built into the receiver optics during manufacturing. Alternatively, the mask could be formed by limiting or shaping the active area of the detection sites in the receiver optic during fabrication. For example, detection sites at the edges of the field of view could be made more oblong than detection sites towards the center of the field of view to account for varying refraction of the expected return signal by the lens throughout the field of view.

Figure 6:
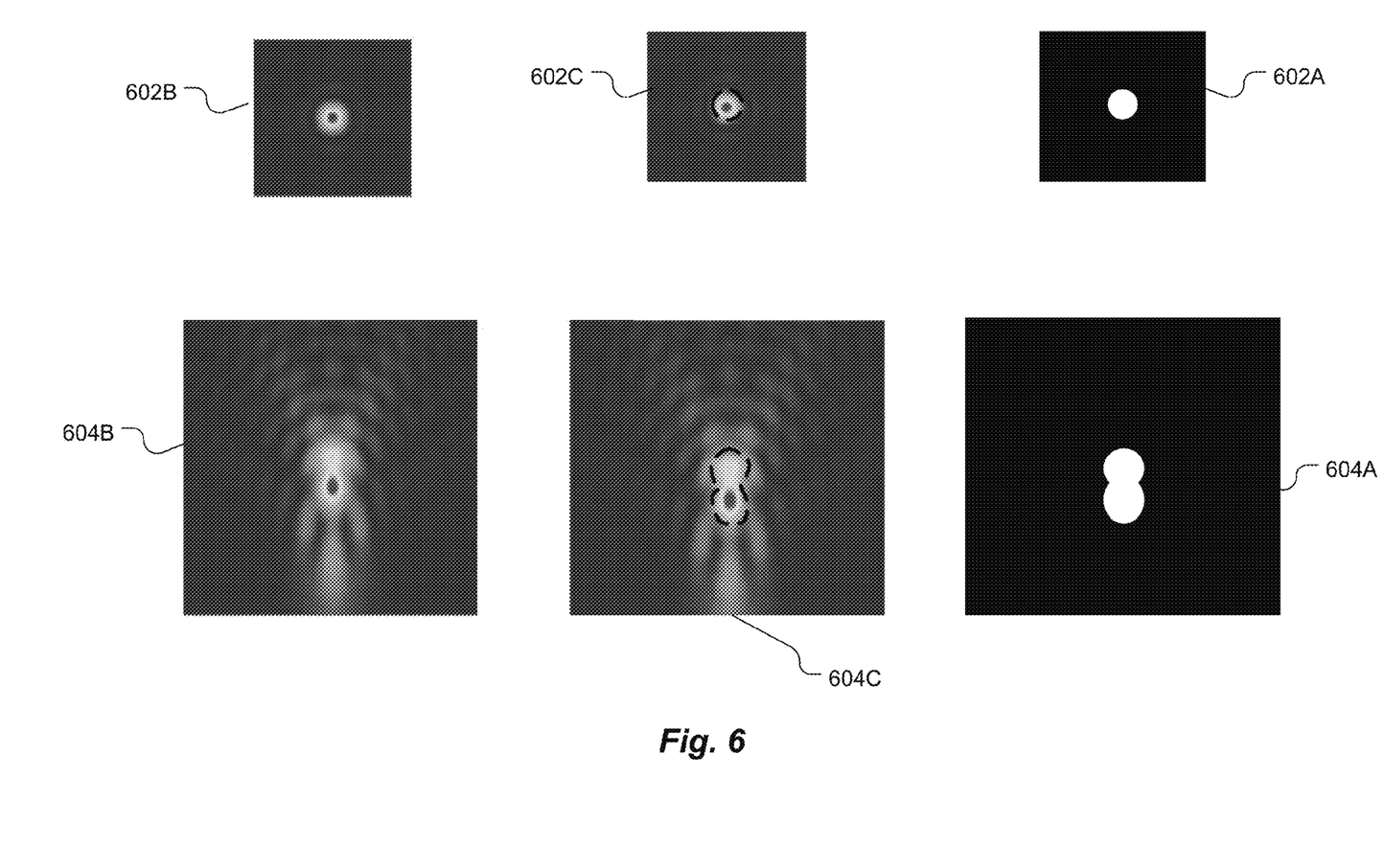
FIG. 6 shows matching size and shape of the apertures to the expected return signal in accordance with an embodiment of the present invention.

FIG. 6 depicts how the shape and size of the apertures is matched to the expected return signal beamspot. Aperture 602A is selected based on the expected circular return signal beamspot 602B. Placing the aperture 602A in the optical path of the return signal results in beamspot 602C. As can be seen, the area through which background photons can reach the optical detection site is minimized. Similarly, aperture 604A is selected based on the expected elongated return signal beamspot 604B. Placing the aperture 604A in the optical path of the return signal results in beamspot 604C. Background photons are mostly masked out by the aperture 604A. However, the resulting beamspot 604C is still large enough that the amount of signal that reaches the detector is maximized.

Attempting to perfectly match the shape and size of the aperture and return signal beamspot leads to tight tolerances on relative placement of the transmitter, receiver, beamsplitter, and lens. Shifts along the optic axis of the transmitter and receiver relative to the objective will primarily lead to a change in size of the return signal beamspot. Shifts perpendicular to the optic axis will lead to changes in position of the beamspot on the receiver. A perfectly sized aperture will therefore reduce the detected signal in the case of misalignments. Using a larger aperture provides greater tolerance on alignment, at the cost of higher background.

Figure 7:
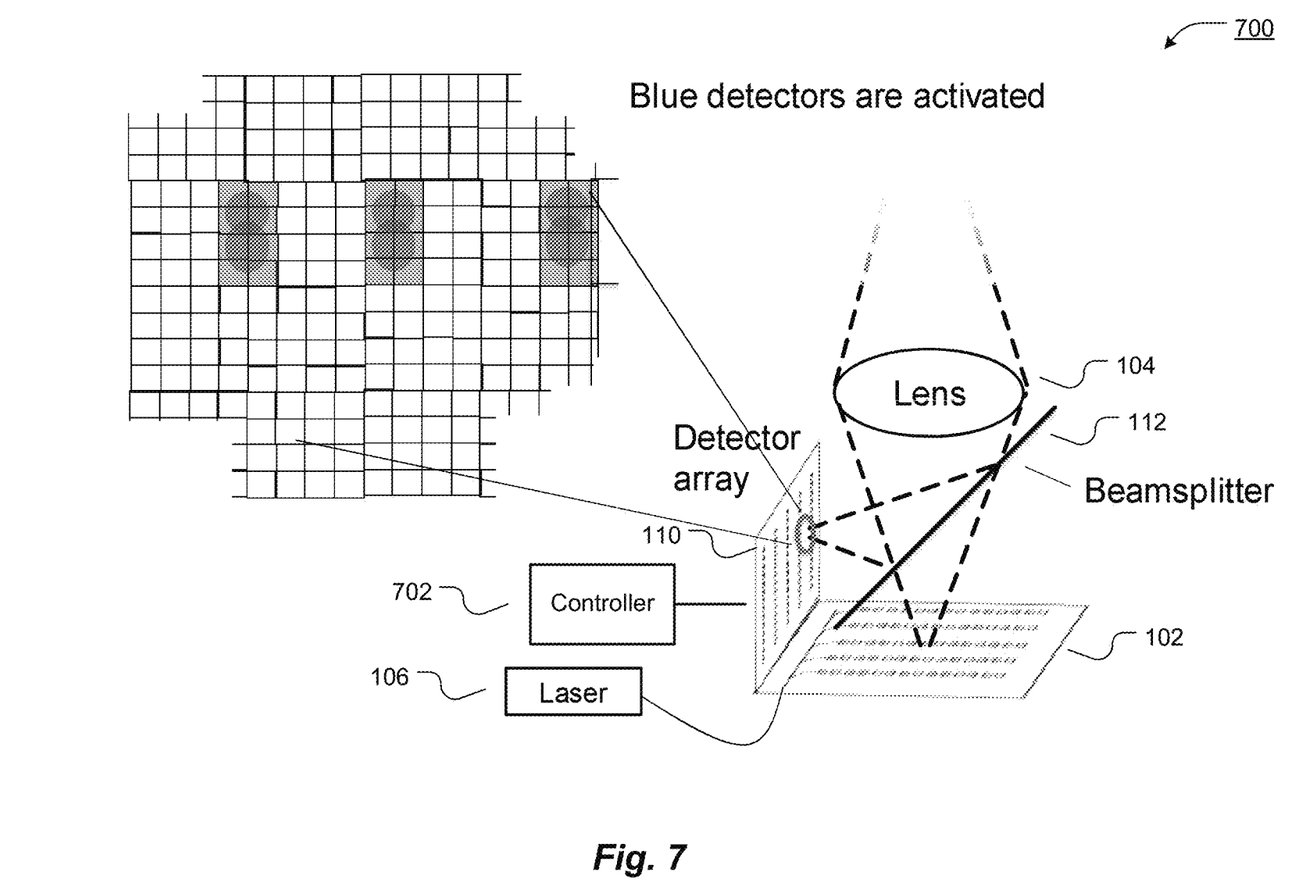
FIG. 7 depicts a LiDAR system in accordance with an embodiment of the present invention.

FIG. 7 depicts a LiDAR system in accordance with an alternative embodiment of the present invention. Similar to the embodiment described above in reference to FIG. 1, in LiDAR system 700 light is emitted from a laser source 106 and routed to a PIC 102. A beamsplitter 112 is placed between the PIC 102 and the objective lens 104. The lens 104 focuses outgoing light into the scene (not shown). The laser light is projected onto the scene as a two-dimensional array of light spots. Return signal is collected by the lens 104 and directed toward the beamsplitter 112 The PIC 102 is located on one side of the beamsplitter 112, while the detector array/receiver optics 110 is located on the other side of the beamsplitter 112. Return signal directed to the detector array 110 does not need to pass through a PIC to reach the detector. Instead, the detector array 110 has a direct mapping of detector elements to emission locations on the transmit PIC 102. One or more detection sites correspond to the light spot projected by each emission site, as described above with reference to FIG. 4

Instead of using a physical barrier such as a mask, multi-element detectors such as detector array 110 provide an opportunity to enable dynamic adjustments to the (simulated) aperture to limit background signal. If each individual optical detection site in the receiver optics/detector array 110 is much smaller than the beamspot projected from a location in the scene onto the receiver optics, then a plurality of optical detection sites can be assigned to each return light spot in the LiDAR system. Based on the shape of the beamspot, specific optical detection sites for this return light spot are selected and activated. The detector array 110 may be a silicon photomultiplier (SiPM). The detector array 110 may also be an array of single-photon avalanche diodes (SPADs), or it may be any other multi-element detector or two-dimensional array of single-element detectors known to a person having skill in the art.

A controller 702 is coupled to the detector array 110 and programmed to selectively activate and deactivate each optical detection site in the detector array 110. The selection which optical detection sites to activate and which to deactivate can be made after aligning the transmitter, receiver, beamsplitter, and lens, and it can be based on the expected beamspot of the return signal projected onto the receiver optics. Lens aberrations and variations in manufacturing of the optical detection sites can be taken into account. Further, the controller can be programmed to account for thermal shifts in the receiver optics during operation of the LiDAR system by adjusting the assignment of optical detection sites to return light spots projected onto the receiver optics.

Alternatively or in addition, the controller 702 may also be coupled to the PIC 102 and programmed to selectively activate and deactivate each optical emission site on the PIC 102. As the laser light from the laser 106 is routed through the PIC 102, activation or deactivation of optical emission sites allows control over which emission sites emit light. As the LiDAR system now knows which optical emission sites on the PIC 102 emit light, optical detection sites in the detector array 110 can be activated and deactivated accordingly by the controller 702. The set of optical detection sites which are turned on for any given emission site can be hard-coded based on the design, or it can be set during an initial calibration routine at the time of manufacture, or set during a periodic calibration during servicing, or set in real time, for example by periodically or continually measuring extra detection sites and, for example, deciding algorithmically whether to use or discard their data based on analysis of that data. The set of detection sites which are turned on for any given emission site can be varied based on environmental factors, such as the temperature of the unit, the amount of stray light in the environment, or the expected range and brightness for that particular pixel, for example.

Figure 8:
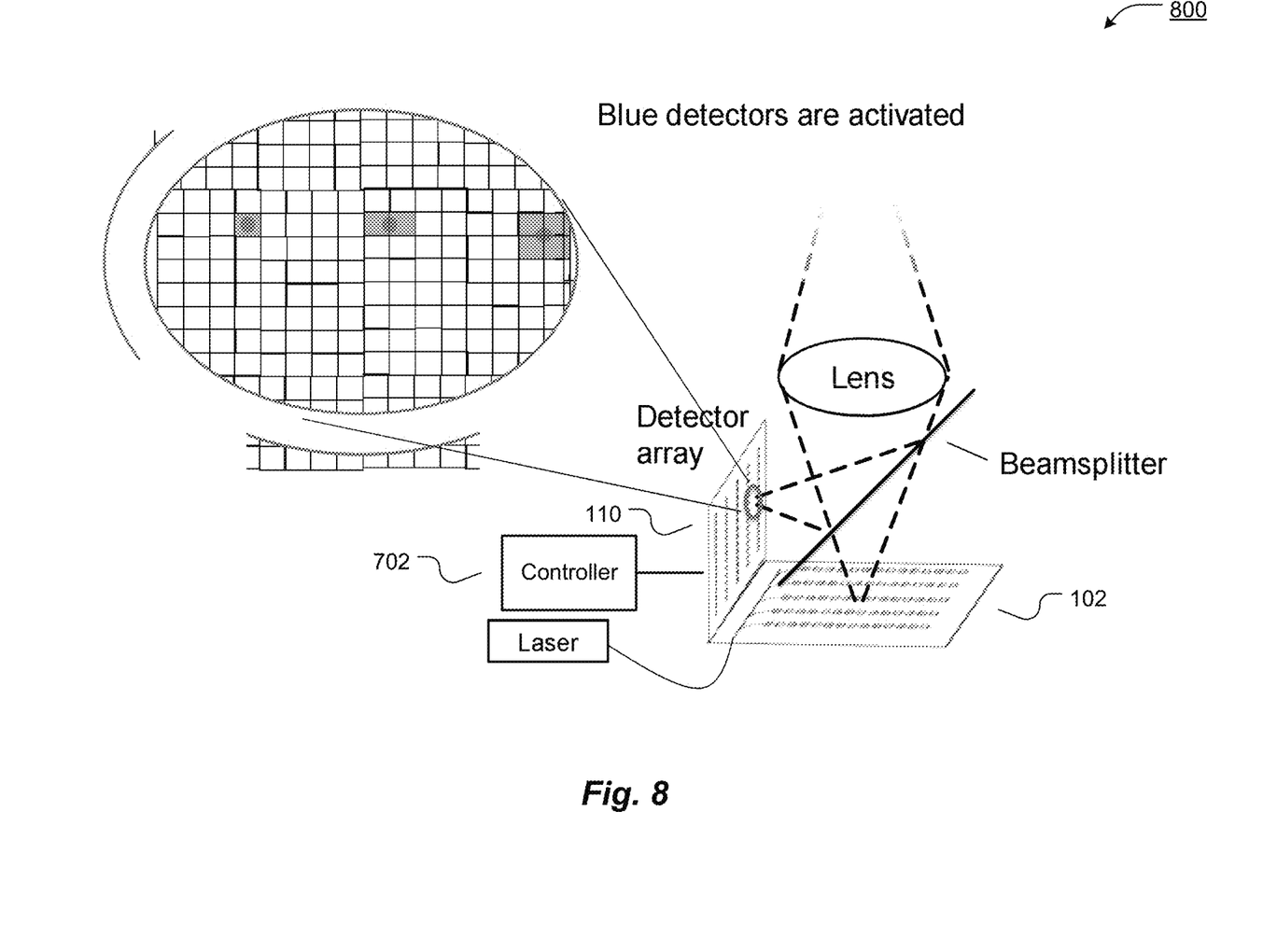
FIG. 8 depicts a LiDAR system in accordance with an embodiment of the present invention.

FIG. 8 shows LiDAR system 800. Similar to LiDAR system 700 described above in reference to FIG. 7, the detector array 110 is coupled to a controller 702 that can selectively activate and deactivate each optical detection site in detector array 110. If the size of an optical detection site in the detector array 110 is close to, or preferably somewhat larger than, the beamspot projected onto the receiver optics, then a single optical detection site, or a plurality of optical detection sites such as a 2×2 array, can be mapped to each pixel. The controller 702 is programmed to only turn on optical detection sites that correspond to the location of an active emission site on the PIC 102. This minimizes the background noise, while allowing for very generous lateral alignment tolerance.

Figure 9:
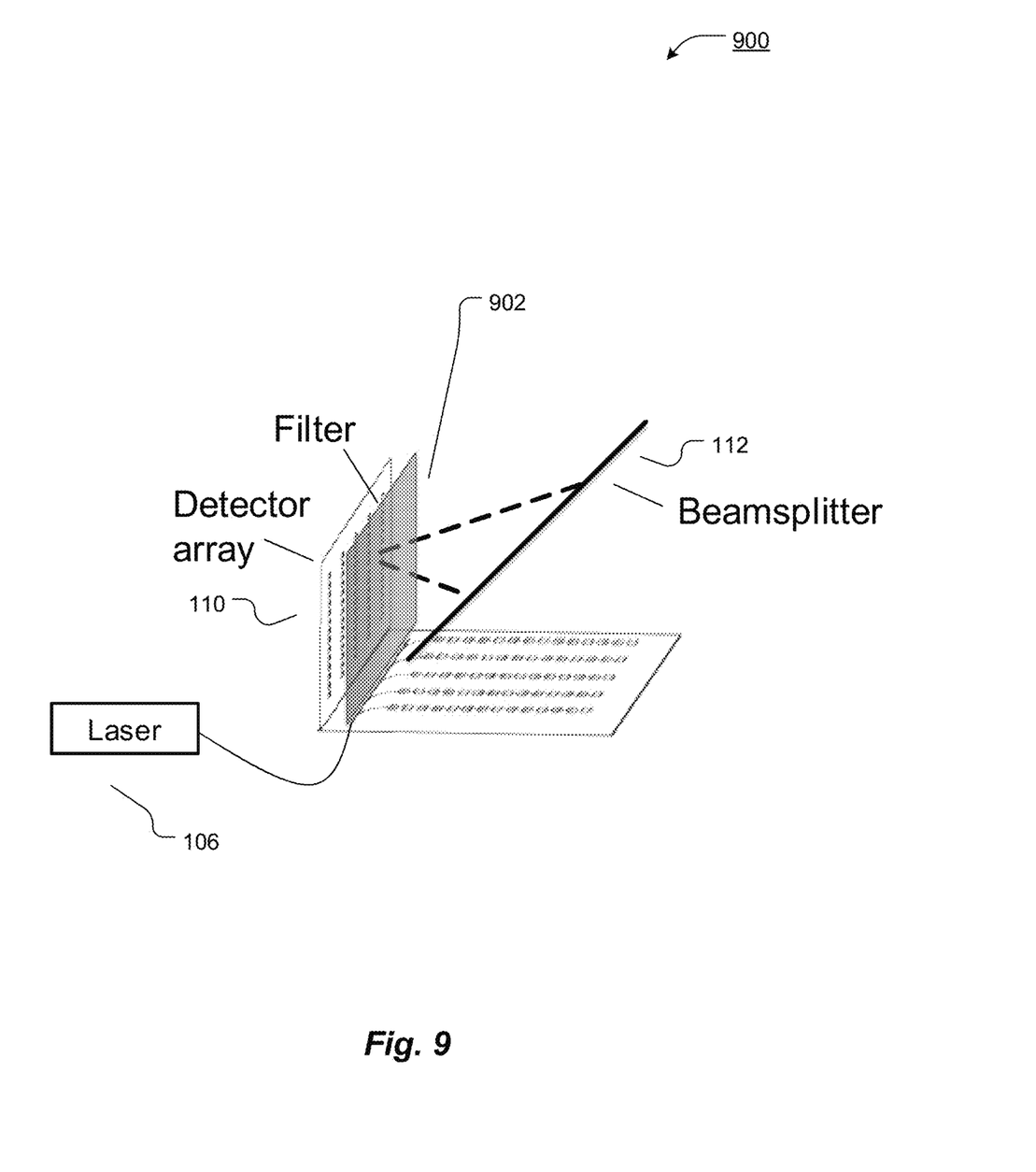
FIG. 9 shows a LiDAR system in accordance with an embodiment of the present invention.

FIG. 9 depicts LiDAR system 900 including a wavelength filter 902 for ambient light reduction. Exemplarily, the wavelength filter 902 may be a dielectric stack filter. The filter bandwidth is generally selected to be centered on the output wavelength of laser 106. Preferably, the filter 902 is placed between the beamsplitter 112 and detector array 110 to avoid loss of outgoing laser power if the filter were placed in the light path between the beamsplitter and the scene. If the objective lens (not shown) design is non-telecentric, then the light approaches the detector at different angles relative to normal, depending on the location in the focal plane. Varying the filter design, e.g. by varying the film thickness of a dielectric stack filter, across the focal plane can ensure the best performance across the full field of view. Alternatively, the filter can be placed within the lens train in a location where the variation in angles of different rays is minimized. One option would be to deposit the filter dielectric stack directly on one of the lens elements. This avoids requiring an additional optic and will ensure good filter performance if there is a lens element that all rays are incident close to normal on.

Figure 10:
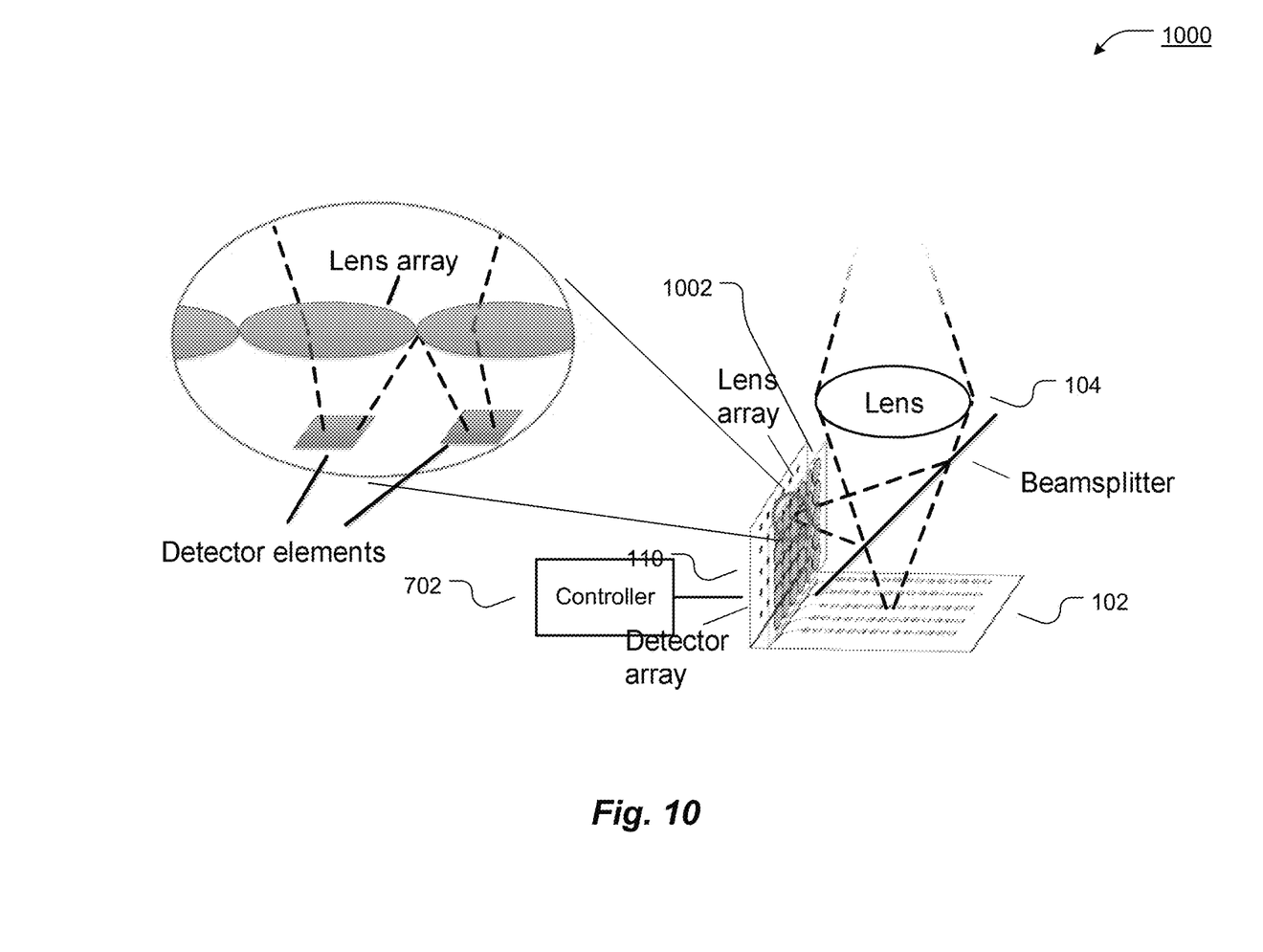
FIG. 10 shows a LiDAR system in accordance with an embodiment of the present invention.

FIG. 10 depicts a LiDAR system in accordance with an embodiment of the present invention. LiDAR system 1000 includes an array of lenses or lenslets 1002. The array of lenses or lenslets 1002 is placed in the light path between the beamsplitter 112 and the receiver optics 110. Inclusion of the lens array 1002 above the detector array 110 minimizes dead regions between optical detection sites in detector array 110 when using selectively activated or deactivated optical detection sites as described above in reference to FIGS. 7 and 8. The lens array 1002 also provides an additional benefit of limiting the angular acceptance of the optical detection sites to reduce the detection of unwanted scattered light. The inclusion of a lens array 1002 above the PIC 102 and/or detector array 110 can also correct for small amounts of field curvature in design of the objective lens 104. This aberration compensation enables smaller aperture sizes over the detector array and thus enables the collection of less background light. For example, the lenses or lenslets in the array 1002 may be microlenses with high refractive indices.

A diffractive optical element can be used in place of a lens array for any of the improvements mentioned above. A diffractive optical element offers the additional capability of compensation for other aberrations in the lens, in addition to field curvature. This is analogous to what is described in U.S. patent application Ser. No. 16/202,254 entitled "Coupling Lens Aberration Correction through Grating Design in a Switched Focal Plane Array" by some of the current inventors, which is incorporated herein by reference in its entirety. However, in the embodiments disclosed herein, the aberration correction only occurs as the light is being received, instead of as the light is being both sent and received. This limits how much correction is possible.

In accordance with certain embodiments of the present invention, the controller programmed to selectively activate and deactivate optical detection sites, as described herein, may be implemented as a computer program product for use with a computer system. Such implementations may include a series of computer instructions fixed either on a tangible medium, which is preferably non-transient and substantially immutable, such as a computer readable medium (e.g., a diskette, CD-ROM, ROM, flash drive, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware (e.g., an ASIC or FPGA). Still other embodiments of the invention are implemented as entirely hardware, or entirely software (e.g., a computer program product).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A light detection and ranging (LiDAR) system comprising:
   a light source;
   an arrayed micro-optic defining an array of optical emission sites and configured to receive light from the light source so as to produce and project a two-dimensional array of light spots on a scene;
   receiver optics having an array of optical detection sites assigned and aligned to each emission site to establish a one-to-one correspondence between the light spots in the two-dimensional array and the optical detection sites in the receiver optics; and
   a beamsplitter and a lens arranged so that light travels from the arrayed micro-optic to the beamsplitter, from the beamsplitter to the lens, and from the lens to the scene and further so that light reflected from the scene travels from the scene to the lens, from the lens to the beamsplitter, and from the beamsplitter to the receiver optics.

2. The LiDAR system of claim 1, further comprising a mask having an array of apertures placed in the light path between the beamsplitter and the receiver optics, wherein each of the apertures is placed in front of a respective one of the optical detection sites.

3. The LiDAR system of claim 2, wherein the mask is built into the receiver optics.

4. The LiDAR system of claim 2, wherein the mask comprises a metal layer having a plurality of openings, each opening being in the light path leading to a respective one of the optical detection sites.

5. The LiDAR system of claim 4, wherein the metal is aluminum or copper.

6. The LiDAR system of claim 1, wherein a shape of at least one of the apertures corresponds to a shape of a light spot received at the respective optical detection site.

7. The LiDAR system of claim 1, wherein a shape of at least one of the apertures is different from a shape of another one of the apertures.

8. The LiDAR system of claim 1, wherein a shape of least one of the apertures is selected to mitigate variations in manufacturing of the respective optical detection site or a thermal shift of the respective optical detection site.

9. The LiDAR system of claim 1, wherein the beamsplitter is a polarization selective beamsplitter.

10. A light detection and ranging (LiDAR) system comprising:
  a light source;
  an arrayed micro-optic defining an array of optical emission sites and configured to receive light from the light source so as to produce and project a two-dimensional array of light spots on a scene;
  receiver optics having an array of optical detection sites assigned and aligned to each emission site to establish a one-to-one correspondence between light spots in the two-dimensional array and optical detection sites in the receiver optics;
  a beamsplitter and a lens arranged so that light travels from the arrayed micro-optic to the beamsplitter, from the beamsplitter to the lens, and from the lens to the scene and further so that light reflected from the scene travels from the scene to the lens, from the lens to the beamsplitter, and from the beamsplitter to the receiver optics; and
  a controller,
  wherein the controller is programmed to selectively activate or deactivate each one of the optical detection sites in the array of optical detection sites.

11. The LiDAR system of claim 10, wherein a size of each optical detection site is smaller than a size of each light spot projected onto the receiver optics.

12. The LiDAR system of claim 10, wherein the optical detection sites are SPAD detectors.

13. The LiDAR system of claim 10, wherein the optical detection sites are SiPM detectors.

14. The LiDAR system of claim 10, further comprising an array of lenslets placed in a light path between the beamsplitter and the receiver optics, wherein each lenslet is placed in front of a respective one of the optical detection sites.

15. The LiDAR system of claim 10, wherein the arrayed micro-optic comprises an array of optical emission sites and wherein the controller is further configured to selectively activate or deactivate each one of the optical emission sites in the array of optical emission sites.

16. The LiDAR system of claim 15, wherein an activation state of at least one of the array of optical emission sites determines an activation state of an associated at least one of the optical detection sites in the array of optical detection sites.

17. A light detection and ranging (LiDAR) system comprising:
  a light source;
  an arrayed micro-optic defining an array of optical emission sites and configured to receive light from the light source so as to produce and project a two-dimensional array of light spots on a scene;
  receiver optics having an array of optical detection sites configured assigned and aligned to each emission site to establish a one-to-one correspondence between the light spots in the two-dimensional array and the optical detection sites in the receiver optics;
  a lens; and
  a beamsplitter, disposed between the arrayed micro-optic and the lens, the arrayed micro-optic being located on one side of the beamsplitter, the receiver optics being located on the other side of the beamsplitter, such that the arrayed micro-optic and the optical detection sites are approximately aligned to form a mirror-image pair with respect to a semi-reflective surface of the beamsplitter, the beamsplitter configured such that outgoing light travels from the arrayed micro-optic to the beamsplitter, from the beamsplitter to the lens, and from the lens to the scene and incoming light reflected from the scene travels from the scene to the lens, from the lens to the beamsplitter, and from the beamsplitter to the receiver optics.

* * * * *